(12) United States Patent
Park et al.

(10) Patent No.: US 6,876,409 B2
(45) Date of Patent: Apr. 5, 2005

(54) LIQUID CRYSTAL DISPLAY SYSTEM AND METHOD OF FABRICATING THE SAME

(75) Inventors: Jong Dae Park, Kyongsangbuk (KR); Jae Woo Park, Kyongsangbuk-do (KR); Seung Won Hwang, Incheon-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 18 days.

(21) Appl. No.: 10/325,844

(22) Filed: Dec. 23, 2002

(65) Prior Publication Data
US 2003/0122995 A1 Jul. 3, 2003

(30) Foreign Application Priority Data
Dec. 29, 2001 (KR) .......................................... 2001-88460

(51) Int. Cl.[7] .......................... G02F 1/1333; G06F 1/16; H05K 5/00; H05K 7/20
(52) U.S. Cl. .......................... 349/58; 361/681; 361/714; 361/752; 345/905
(58) Field of Search ........................... 349/58; 361/681, 361/714, 752; 345/905

(56) References Cited

U.S. PATENT DOCUMENTS

| | | | | | |
|---|---|---|---|---|---|
| 5,905,550 | A | * | 5/1999 | Ohgami et al. | 349/58 |
| 6,128,183 | A | * | 10/2000 | Uchiyama et al. | 361/681 |
| 6,330,148 | B1 | * | 12/2001 | Won et al. | 361/681 |
| 6,507,484 | B2 | * | 1/2003 | Fukuyoshi | 361/681 |
| 6,639,635 | B2 | * | 10/2003 | Wang | 349/58 |

* cited by examiner

Primary Examiner—Tarifur R. Chowdhury
Assistant Examiner—Hoan C. Nguyen
(74) Attorney, Agent, or Firm—Morgan Lewis & Bockius LLP

(57) ABSTRACT

A liquid crystal display system is disclosed, that includes rear cover having a coupling boss formed therein, a liquid crystal module positioned in the rear cover and having a plurality of protruding structures formed at both sides thereof, a bracket coupled to the liquid crystal module by a groove receiving the protruding structures of the liquid crystal module, and having a hole formed at a location corresponding to the coupling boss of the rear cover, and a fixing tool inserted into the hole of the bracket and the boss of the rear cover.

23 Claims, 6 Drawing Sheets

LIQUID CRYSTAL DISPLAY SYSTEM AND METHOD OF FABRICATING THE SAME

The present invention claims the benefit of Korean Patent Application No. P2001-88460 filed in Korea on Dec. 29, 2001, which is hereby incorporated by reference.

BACKGROUND OF THE INVENTION

1. Field of the Invention

The present invention relates to a liquid crystal display system, and more particularly, to a coupling part for coupling a liquid crystal (LC) module to system equipment.

2. Discussion of the Related Art

Liquid crystal display (LCD) devices are gaining popularity due to their low power consumption and thin structure. Due to these characteristics, LCD devices have a variety of applications. LCD devices are formed by coupling a slim LC module to system equipment. Conventionally, the LC module and the system equipment are coupled using a rectangular bracket that is a rectangular-shaped coupling tool. A coupling structure of a LCD system according to the related art will be described with reference to the accompanying drawings.

FIG. 1A is a perspective view showing a structure before an LC module and a system equipment are assembled. The LC module 10 has a hole 12 formed at both sides, and a rear cover 20 of the system equipment has a coupling boss 22 formed at both corners. A bracket 30 is provided to fix the LC module 10 to the rear cover 20, and it has a first hole 32 corresponding to the hole 12 of the LC module 10 and a second hole 34 corresponding to the coupling boss 22 of the rear cover 20.

In the assembly process of the LC module 10, the rear cover 20, and the bracket 30, the hole 12 of the LC module 10 is first aligned with the first hole 32 of the bracket 30, and then they are coupled to each other using a screw 40. Thereafter, the second hole 34 of the bracket 30 is aligned with the boss 22 of the rear cover 20, and they are fixed to each other using a screw 40a so that the LC module 10 is assembled to the rear cover 20 of the system equipment.

The inner structure of the LC module 10 assembled to the rear cover 20 of this system equipment is described below.

FIG. 1B is an enlarged sectional view taken along the line I–I' of FIG. 1A. Referring to FIG. 1B, the LC module 10 is comprised of an LC panel 11 including an upper substrate 14, a lower substrate 16 and a liquid crystal layer interposed therebetween. The LC module further includes a backlight assembly 13 disposed below the LC panel 11, and an upper case 15 and a lower case 17 equipped on outer circumference of the LC panel and the backlight, to protect the LC panel 11 and the backlight assembly 13. In addition, a supporting member 19 is located inside cases 15 and 17 so that the LC panel 11 and the backlight assembly 13 can be fixed without sway. In order to fix the LC module 10 to the bracket 30, a hole is formed at both sidewalls of the upper case 15 and the lower case 17. A screw is inserted into the holes of the upper case 15 and the lower case 17, and into the first hole of the bracket 30. However, the aforementioned conventional assembly structure has the following problems.

First, in FIG. 1C the LC panel 11 of the LC module comprises the upper substrate 14, the lower substrate 16, the liquid crystal layer interposed between the upper substrate 14 and the lower substrate 16, and a driving circuit part 18. Therefore, when fixing the bracket 30 to the LC module using the screw 40, the hole 12 formed at the side portion of the LC module should be formed at a portion where the driving circuit part 18 is not formed, thus lowering the exchangeability during the fabrication of the LC module by system manufacturers.

Secondly, to meet recent demands, the LCD devices have a trend toward slimed and miniaturized characteristics. Since the screw 40 is inserted inside the LC module 10, the volume of the LC module increases in proportional to the volume of the screw 40.

Thirdly, since the screw 40 is made of metal, metallic powder may be generated and damage the LC panel during the insertion of the screw.

SUMMARY OF THE INVENTION

Accordingly, the present invention is directed to a liquid crystal display system and a method of manufacturing the same that substantially obviates one or more problems due to limitations and disadvantages of the related art.

An object of the present invention is to provide a liquid crystal display system and method of manufacturing the same having a coupling part in which the location of the coupling part is not limited during the coupling of the LC module, the LC panel is not damaged by foreign particles, and the coupling part is suitable for fabricating the LC module in a slim structure.

Additional features and advantages of the invention will be set forth in part in the description which follows, and in part will become apparent from the descriptive or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display system includes: a rear cover having a coupling boss formed therein, an liquid crystal module positioned in the rear cover and having a plurality of protruding structures formed at both sides thereof, a bracket coupled to the liquid crystal module by a groove receiving the protruding structures of the liquid crystal module, and having a hole formed at a location corresponding to the coupling boss of the rear cover, and a fixing tool inserted into the hole of the bracket and the boss of the rear cover.

In another aspect a liquid crystal display device includes a rear cover having at least one coupling formed therein, an liquid crystal module having at least one protruding structure formed along at least one side thereof, at least one bracket coupled to the liquid crystal module by a groove, and having at least one hole formed at a location corresponding to the coupling for the rear cover, and at least one fixing tool inserted into the hole of the bracket.

In another aspect a method of fabricating a liquid crystal display device including the steps of forming a rear cover having at least one coupling therein, forming an liquid crystal module having at least one protruding structure along at least one side thereof, forming at least one bracket coupled to the liquid crystal module by a groove, and having at least one hole formed at a location corresponding to the coupling for the rear cover; and fixing a tool into the at least one hole of the bracket.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
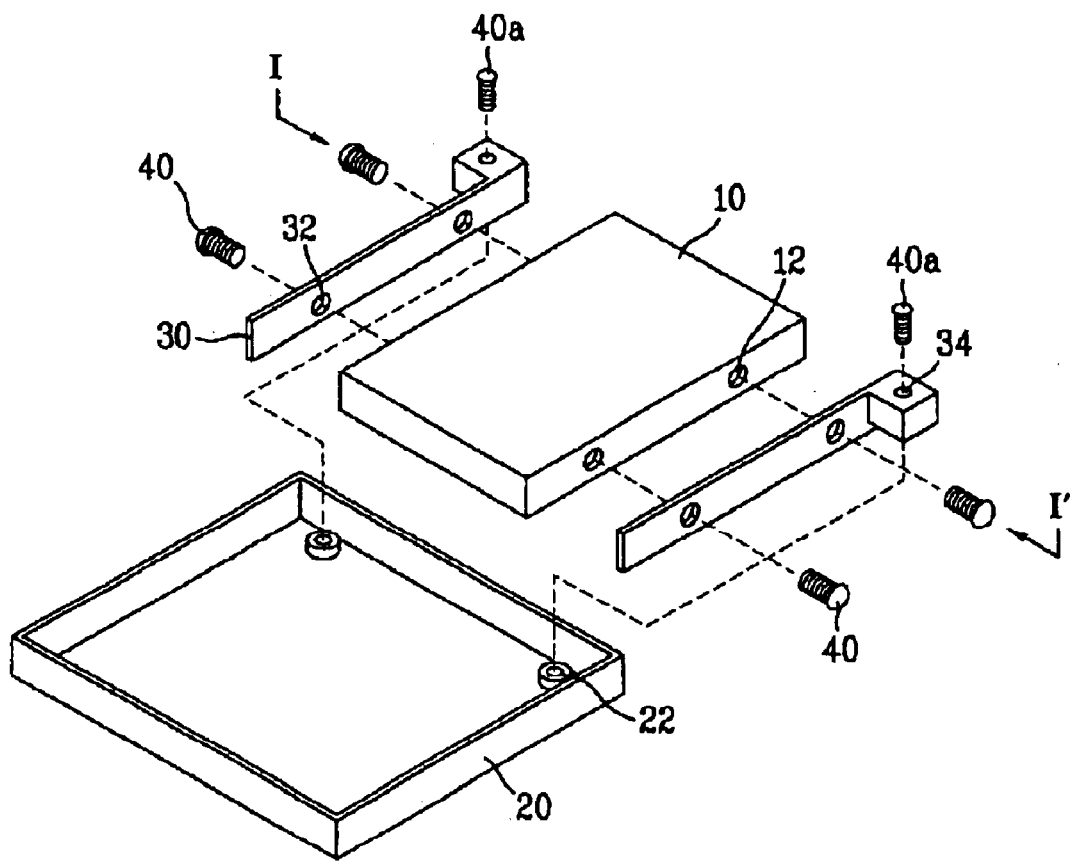
FIG. 1A is a perspective view of a LCD system prior to the coupling thereof according to the related art.
Figure 1B:
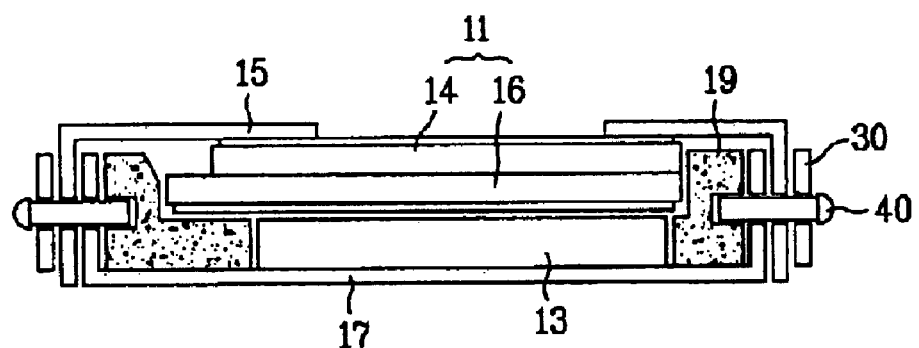
FIG. 1B is an enlarged cross-sectional view taken along I–I' of FIG. 1A.
Figure 1C:
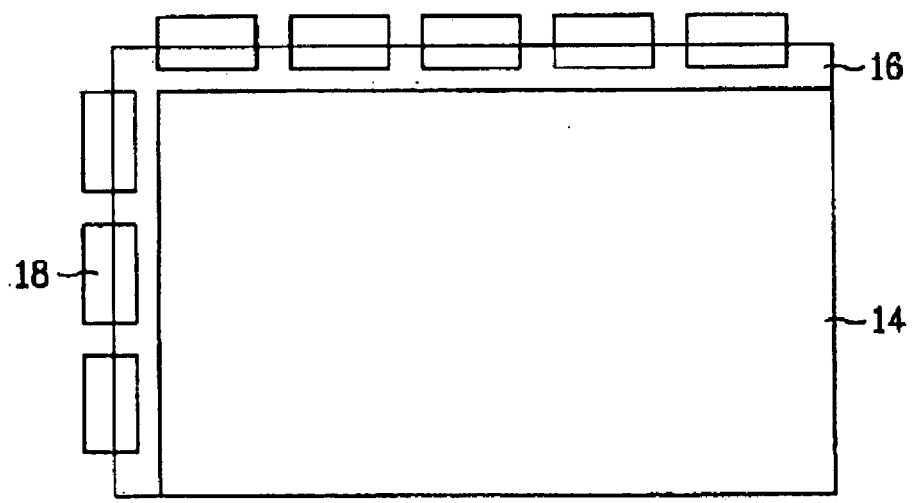
FIG. 1C is a diagram showing a LCD Panel according to the related art.
Figure 2:
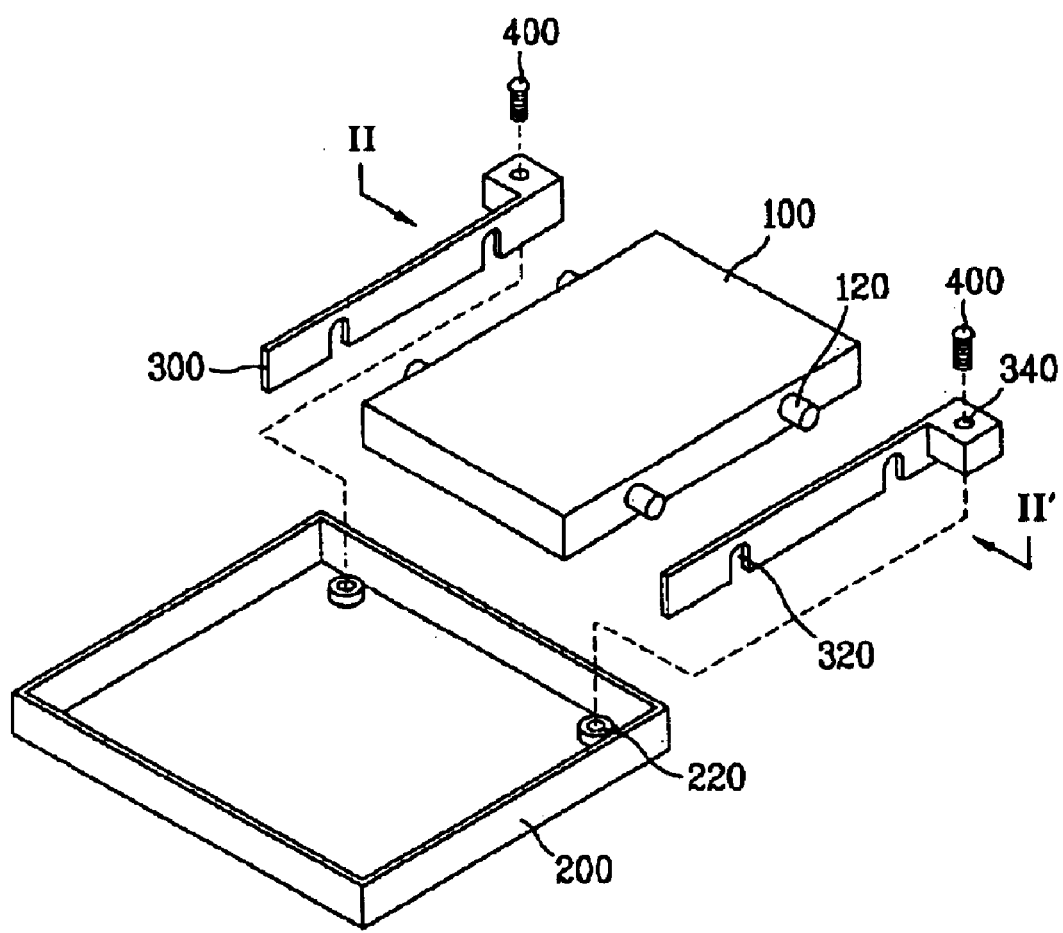
FIG. 2 is a perspective view of an exemplary LCD system prior to the coupling of the LCD system according to the present invention.

FIG. 2 is a perspective view of an exemplary LCD system prior to the coupling of the LCD system according to the present invention In FIG. 2, the liquid crystal display system may include an LC module 100 having a plurality of protruding structures 120 formed at right and left sides thereof, and a rear cover 200 of a system equipment having a coupling boss 220 formed at both corners of one side. In addition, the LCD system may be provided with a bracket 300 for fixing the LC module 100 to the rear cover 200. The bracket 300 may include a groove 320 receiving the protruded structures 120 of the LC module 100, and a hole 340 formed at a location corresponding to the coupling boss 220 of the rear cover 200.

During an exemplary coupling process of the LC module 100, the bracket 300 may be coupled to the LC module 100 by inserting the protruding structures 120 of the LC module 100 into the grooves 320 of the bracket 300. Then, the hole 340 of the bracket 300 may be aligned with the boss 220 of the rear cover 200, and a fixing tool 400 such as a screw may be inserted into hole 340 of bracket 300 and to boss 220 to couple them, thereby coupling the LC module 100 to the rear cover 200 of the system equipment.

The rear cover 200 may be a rectangular frame structure having an inner space and coupling bosses 220 formed at the inner space. In FIG. 2, the coupling bosses 220 may be formed at both corners of the inner surface of an upper side of the rear cover. However, the coupling bosses 220 may be formed at both corners of the inner surface of a lower side, or at both corners of the inner surface of the right and left sides. Accordingly, in case the locations of the coupling bosses 220 are changed, the locations of the protruding structures may also be changed. In addition, the locations of the holes 340 of the bracket 300 may also be changed to correspond to the changed locations of the coupling bosses 220.

Figure 3:
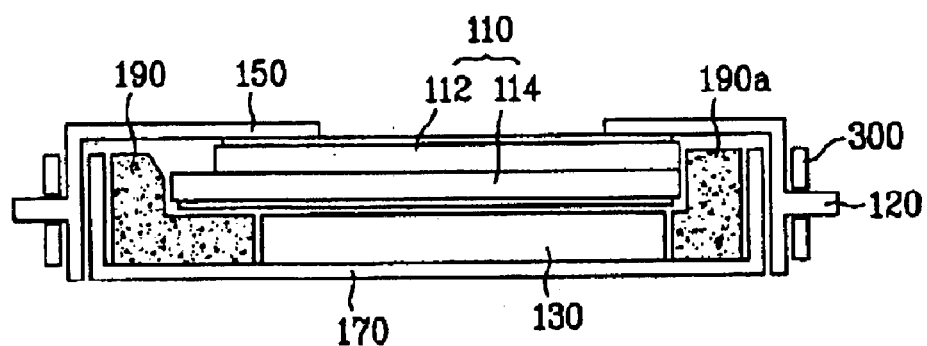
FIGS. 3 and 4 are cross-sectional views taken along II–II' of FIG. 2 according to the present invention.
Figure 4:
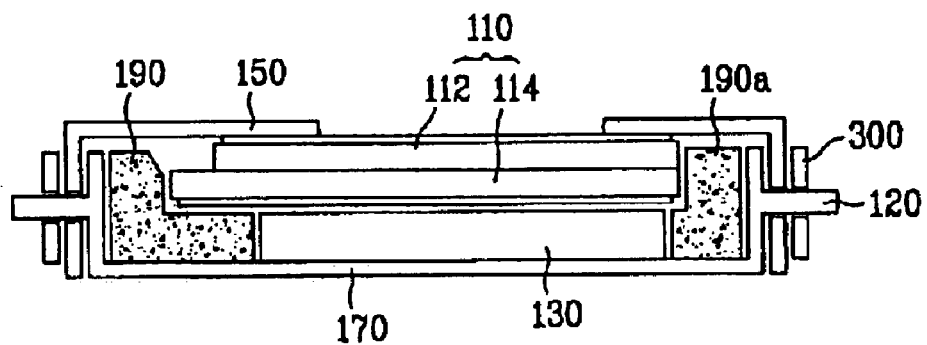

FIGS. 3 and 4 are cross-sectional views taken along II–II' of FIG. 2 according to the present invention.

In FIGS. 3 and 4, the LC module 100 may include an LC panel part 110 having an upper substrate 112, a lower substrate 114 and a liquid crystal layer interposed therebetween. In addition, the LC module 100 may include a driving circuit part (not shown) connected with the LC panel part 110 for applying a signal to the liquid crystal layer, a backlight part 130 disposed below the LC panel 110, an outer case including an upper case 150 and a lower case 170 equipped on an outer surface of the LC panel part 110 and the backlight part 130, and a supporting structure 190 and 190a formed in the outer case, for preventing sway of the LC panel part 110 and the backlight part 130.

In FIG. 3, the protruded structure 120 of the LC module 100 may be formed at the upper case 150 of the LC module 120, or formed at the lower case 170 as shown in FIG. 4. In general, the outer case may be formed such that the upper case 150 covers the lower case 170. Accordingly, the protruded structure 120 formed in the lower case 170 as shown in FIG. 4 may be variously modified.

Figure 5A:
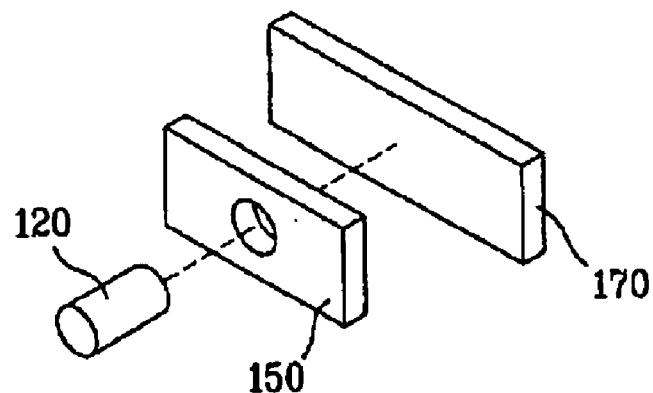
FIGS. 5A and 5B are perspective views showing an exemplary method for forming a protruding structure at a lower case according to the present invention.
Figure 5B:
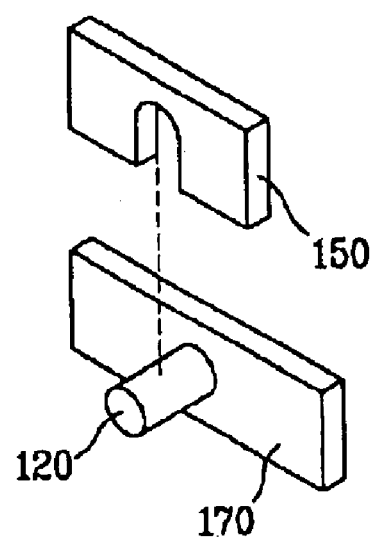

FIGS. 5A and 5B are perspective views showing an exemplary method for forming a protruding structure at a lower case according to the present invention.

In FIG. 5A, an upper case 150 having a hole of a shape corresponding to the protruded structure may be formed to cover side portions of a lower case 170 not having a protruded structure or hole. Then, a protruded structure 120 may be welded to the lower case 170 through the hole of the upper case. In FIG. 5B an upper case 150 may include an opened groove and a protruded structure 120 formed on the side portion of the lower case 170 by a welding method, for example. The open groove of the upper case 150 may be coupled with the protruded structure 120 of the lower case 170 by covering the upper case 150 on the lower case 170. In addition, the protruded structure 120 may have a polygonal structure that includes at least four angles, such as quadrangle, pentagon, and hexagon.

In order to apply an electrical signal to the LC panel, the driving circuit part may be connected to the lower substrate 114 of the LC panel part 110. Accordingly, the left side of the lower substrate 114 connected with the driving circuit part may be formed longer than the upper substrate 112. In addition, upon considering the characteristic of the fabrication process of the LC panel part 110, the side portion of the LC panel part connected with the driving circuit part may be grind-treated while the opposite side portion may not. Therefore, a problem may occur if a foreign particle is generated due to friction of a face of the LC panel part 110 where the grind treatment is not performed and the driving circuit part is not formed, and a supporting structure 190a equipped inside the outer case so as to support the LC panel part 110.

Figure 6A:
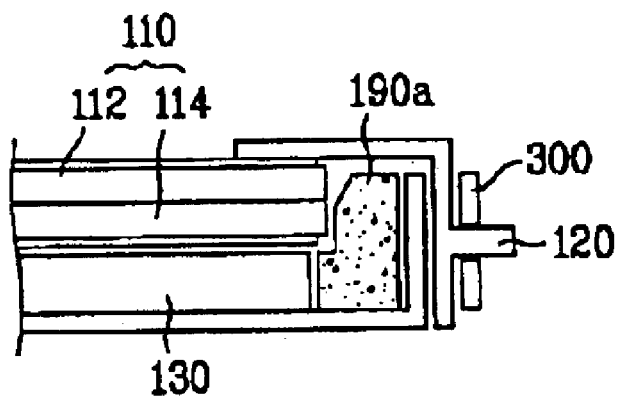
FIGS. 6A and 6B are cross-sectional views of exemplary LC modules according to the present invention.
Figure 6B:
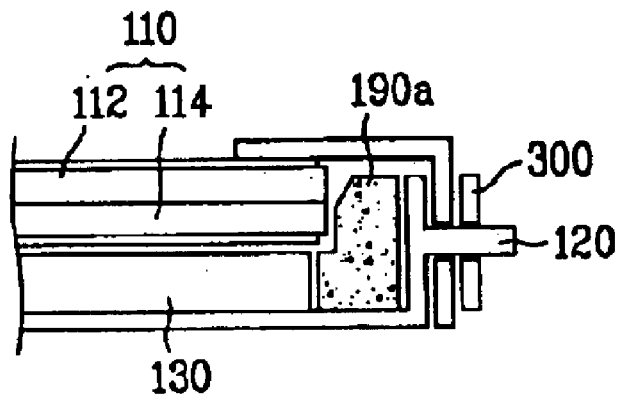

FIGS. 6A and 6B are cross-sectional views of exemplary LC modules according to the present invention.

In FIGS. 6A and 6B, the shape of the supporting structure 190a formed at the side portion of the LC panel 110 where the driving circuit part may not be formed is modified. The supporting structure 190a may be formed such that a side face is parallel to the side face of the lower substrate of the LC panel but is oblique by a predetermined angle with respect to the side face of the upper substrate of the LC panel, thereby preventing occurrence of foreign particles.

Further, the LCD system can prevent damage of the LC panel due to foreign particle.

It will be apparent to those skilled in the art that various modifications and variations can be made in the liquid crystal display system and method of fabricating the same. Thus, it is intended that the present invention covers the modifications and variations of this invention provided they come within the scope of the appended claims and their equivalents.

What is claimed is:

1. A liquid crystal display system, comprising:
   a rear cover having a coupling boss formed therein;
   a liquid crystal module positioned in the rear cover and having a plurality of protruding structures formed at least two sides thereof;
   at least two brackets respectively coupled to one of the two sides of the liquid crystal module by a groove receiving the protruding structures of the liquid crystal module, and having a hole formed at a location corresponding to the coupling boss of the rear cover; and
   a fixing tool inserted into the hole of the bracket and the boss of the rear cover, the fixing tool being inserted after the brackets are coupled to the liquid crystal module.

2. The system according to claim 1, wherein the liquid crystal module includes a liquid crystal panel part including an upper substrate, a lower substrate, and a liquid crystal layer interposed therebetween.

3. The system according to claim 2, wherein the liquid crystal module includes a driving circuit connected with the liquid crystal panel part, for applying a signal to the liquid crystal layer of the liquid crystal panel part.

4. The system according to claim 2, wherein the liquid crystal module includes a backlight part disposed below the liquid crystal panel part.

5. The system according to claim 4, wherein the liquid crystal module includes an outer case including an upper case and a lower case equipped on an outer surface of the liquid crystal panel part and the backlight part.

6. The system according to claim 5, wherein the protruding structures are positioned at the lower case of the liquid crystal module.

7. The system according to claim 5, wherein the upper case includes holes, having shapes corresponding to the protruding structures at a location corresponding to the protruding structures.

8. The system according to claim 5, wherein the upper case has a groove for receiving the protruding structures.

9. The system according to claim 4, wherein the liquid crystal module includes a supporting structure formed in the outer case for preventing sway of the liquid crystal panel part of the backlight part.

10. The system according to claim 9, wherein the supporting structure is formed to be oblique with respect to the upper substrate of the liquid crystal panel at a side portion of the liquid crystal panel where the driving circuit part is not formed.

11. The system according to claim 1, wherein the protruding structures are positioned at an upper case of the liquid crystal module.

12. The system according to claim 1, wherein the protruding structures are one of a circular shape and a shape having at least four angles.

13. The system according to claim 1, wherein the fixing tool includes a screw.

14. A liquid crystal display device comprising:
   a rear cover having at least one coupling formed therein;
   a liquid crystal module having at least one protruding structure formed along at least one side thereof;
   at least one bracket coupled to the liquid crystal module by a groove, and having at least one hole formed at a location corresponding to the coupling for the rear cover; and
   at least one fixing tool inserted into the hole of the bracket, the fixing tool being inserted after the bracket is coupled to the liquid crystal module.

15. The device according to claim 14, wherein the liquid crystal module comprises: a liquid crystal panel part including an upper substrate, a lower substrate, and a liquid crystal layer interposed therebetween; a driving circuit connected with the liquid crystal panel part; a backlight part disposed below the liquid crystal panel part; an outer case including an upper case and a lower case equipped on an outer surface of the liquid crystal panel part and the backlight part; and a supporting structure formed in the outer case.

16. The device according to claim 15, wherein the supporting structure is formed to be oblique with respect to the upper substrate of the liquid crystal panel at a side portion of the liquid crystal panel where the driving circuit part is not formed.

17. The device according to claim 15, wherein the protruding structure is formed at the lower case of the liquid crystal module.

18. The device according to claim 15, wherein the upper case includes a hole having a shape corresponding to the protruding structure at a location corresponding to the protruding structure.

19. The device according to claim 15, wherein the upper case has a groove for receiving the protruding structure.

20. The device according to claim 14, wherein the protruding structure is formed at an upper case of the liquid crystal module.

21. The device according to claim 14, wherein the protruding structure is one of a circular shape and a shape having at least four angles.

22. The device according to claim 14, wherein the fixing tool includes a screw.

23. A method of forming a liquid crystal display device, comprising:
   forming a rear cover having at least one coupling therein;
   forming a liquid crystal module having at least one protruding structure along at least one side thereof;
   forming at least one bracket coupled to the liquid crystal module by a groove, and having at least one hole formed at a location corresponding to the coupling for the rear cover; and
   fixing a tool into the at least one hole of the bracket after coupling the at least one bracket to the liquid crystal module.

* * * * *